Patented Jan. 24, 1939

2,145,128

UNITED STATES PATENT OFFICE 2,145,128

METHOD OF TEMPERING GLASS ARTICLES

Charles John Phillips, Corning, N. Y., assignor to Corning Glass Works, Corning, N. Y., a corporation of New York No Drawing. Application November 11, 1936, Serial No. 110,386

7 Claims. (Cl. 49—89)

This invention relates to the tempering of glass articles by heating them to a predetermined temperature and chilling or quenching them in a liquid bath which is heated to a lower temperature whereby the resistance of the glass articles to mechanical shock and to thermal change is increased.

Liquid media vary widely in their ability to produce temper in heated glass articles quenched therein. Some liquids such as water and some molten metals of low melting point are so severe in their chilling action that they cause rupture of the glass or its surface. In other words, the rate of transfer of heat from the glass to the liquid is so great that the tensile strength of the glass is exceeded by the stress thus introduced and rupture results. The liquid media which have heretofore been found satisfactory for tempering glass articles, such as oils, fats, waxes and resins, are relatively mild in their action as compared to water and molten metals. However, the above recited satisfactory media do not impart to heated glass articles which are quenched therein as high a degree of temper as that which the glass is capable of withstanding without rupture. Consequently, for practical purposes, the latter liquid media are considered to be too mild in their chilling action. In this case the rate of transfer of heat from the glass to the liquid is not rapid enough.

In order to obtain a higher degree of temper than that which is possible with the prior media, it has recently been proposed to employ liquid baths of molten alkali nitrates or mixtures thereof. The use of molten alkali nitrates as chilling media constitutes a distinct advance in the art and by means of such baths glass articles can be tempered to the limit of their endurance, that is, to the maximum degree of temper which they will withstand without rupture. Due to unavoidable inhomogeneities in the glass articles and other conditions attendant upon their manufacture, the use of chilling media having a high rate of heat transfer increases the spoilage, that is, increases the proportion of articles which become ruptured or develop surface checks upon quenching.

The primary object of this invention is to lessen the cracking and checking of the glass articles during the tempering process.

Another object is to temper glass articles to a higher degree of tempered strength than it has been possible to attain heretofore without disrupting the article or its surface.

The above and other objects may be accomplished by practicing my invention, which embodies among its features heating a glass article until its interior is at a temperature between its strain and its softening points and chilling it in a liquid bath comprising a molten mixture containing an alkali nitrate together with an alkaline earth nitrate or lead nitrate.

I have found that in general when an alkaline earth nitrate or lead nitrate is added to a liquid molten salt bath containing an alkali nitrate or mixture of alkali nitrates a higher degree of temper is obtained with less checking and cracking of the ware which is chilled therein and this result is accomplished with the chilling bath at a lower operating temperature than could be accomplished in the same bath if the alkaline earth nitrate or lead nitrate were omitted. In other words, the addition of alkaline earth nitrates or lead nitrate to an alkali nitrate chilling bath causes it to become milder in its chilling action. Moreover, the melting point of an alkali nitrate bath is usually lowered by such addition.

As an example of this effect, glass casseroles were heated for two minutes and thirteen seconds at 750° C. and were immediately chilled by being immersed in the following chilling bath mixtures, the proportions of the constituents of which are stated in mols % and whose melting points are indicated in parentheses:

A. 53 $KNO_3$ + 47 $NaNO_3$ (M. P. 219° C.)
B. 45 $KNO_3$ + 20 $NaNO_3$ + 35 $Ca(NO_3)_2$ (M. P. 175° C.)
C. 66.6 $NaNO_3$ + 33.3 $Ca(NO_3)_2$ (M. P. 236° C.)

Ten casseroles were quenched in each bath. The following results were obtained:

| Chilling bath No. | Temperature of chilling bath °C. | Number cracked | Number good | Maximum tension kg/mm². |
|---|---|---|---|---|
| A | 300 | 6 | 4 | 2.83 |
| B | 245 | 1 | 9 | 3.28 |
| C | 280 | 4 | 6 | 2.87 |

From the above it will be observed that chilling baths B and C are milder in action than A and it will be noted that not only did baths B and C produce a higher degree of temper at a lower operating temperature than bath A but they also caused less breakage of the ware. A further advantage of my improved chilling baths is that their lower operating temperatures lessen the corrosion and wear on the bath container and decrease the operating hazard to the workmen tending the bath.

Although the proportions stated in the above recited improved chilling baths are to be preferred, my researches have shown that other proportions may be used and will produce some of the benefits of my invention.

Moreover, although calcium is the most effective of the alkaline earths, I have found that barium and strontium produce a similar effect. The following table shows some of the chilling baths which I have used together with their melting points, the proportions being in mols % except when otherwise stated:

| No. | Chilling bath mixture | Melting point |
|---|---|---|
| | | °C. |
| D | 42.5 $KNO_3$+37.5 $NaNO_3$+20 $Ba(NO_3)_2$ | 170 |
| E | 35.3 $KNO_3$+31.3 $NaNO_3$+33.3 $Ba(NO_3)_2$ | 200 |
| F | 44.8 $KNO_3$+35.2 $NaNO_2$+20 $Ba(NO_3)_2$ | 185 |
| G | 47.7 $KNO_3$+42.3 $NaNO_3$+10 $Sr(NO_3)_2$ | 202 |
| H | 80% by weight $NaNO_3$+20% by weight $Pb(NO_3)_2$ | 297 |
| I | 80% by weight $KNO_4$+20% by weight $Pb(NO_3)_2$ | 287 |

It will be noted that bath F contains sodium nitrite, thus showing that my invention is effective with baths containing an alkali nitrite.

I claim:

1. The method of tempering a glass article, which includes heating it until its interior is at a temperature between the strain point and the softening point of the glass and chilling it in a liquid bath containing a molten alkali nitrate and a molten nitrate selected from the group consisting of alkaline earth nitrates and lead nitrate.

2. The method of tempering a glass article, which includes heating it until its interior is at a temperature between the strain point and the softening point of the glass and chilling it in a liquid bath containing a molten alkali nitrate and a molten alkaline earth nitrate.

3. The method of tempering a glass article, which includes heating it until its interior is at a temperature between the strain point and the softening point of the glass and chilling it in a liquid bath containing a molten alkali nitrate and molten lead nitrate.

4. The method of tempering a glass article, which includes heating it until its interior is at a temperature between the strain point and the softening point of the glass and chilling it in a liquid bath containing a molten mixture of alkali nitrates and an alkaline earth nitrate.

5. The method of tempering a glass article, which includes heating it until its interior is at a temperature between the strain point and the softening point of the glass and chilling it in a liquid bath containing a molten mixture of a nitrate and a nitrite of at least two alkali metals and an alkaline earth nitrate.

6. The method of tempering a glass article, which includes heating it until its interior is at a temperature between the strain point and the softening point of the glass and chilling it in a bath of molten salts consisting approximately of 45 mol % $KNO_3$, 20 mol % $NaNO_3$ and 35 mol % $Ca(NO_3)_2$.

7. The method of tempering a glass article, which includes heating it until its interior is at a temperature between the strain point and softening point of the glass and chilling it in a bath of molten salts consisting approximately of 66.6 mol % $NaNO_3$ and 33.3 mol % $Ca(NO_3)_2$.

CHARLES JOHN PHILLIPS.